United States Patent
Heinz et al.

[11] Patent Number: 6,037,865
[45] Date of Patent: Mar. 14, 2000

[54] VEHICLE HAVING AN ELECTROLUMINESCENT LIGHT BAND

[75] Inventors: Werner Heinz, Tiefenbronn; Wolfgang Mueller, Sindelfingen, both of Germany

[73] Assignee: DaimlerChrysler AG, Germany

[21] Appl. No.: 09/175,361

[22] Filed: Oct. 20, 1998

[30] Foreign Application Priority Data

Oct. 20, 1997 [DE] Germany .............. 197 45 993

[51] Int. Cl.⁷ ...................................... B60Q 1/26
[52] U.S. Cl. ................. 340/468; 340/463; 340/456; 362/84
[58] Field of Search .................. 340/463–468, 340/471, 475, 479, 815.42, 815.43, 456; 362/84, 506, 540, 240, 103, 62; 40/593, 544; 327/108

[56] References Cited

U.S. PATENT DOCUMENTS

| | | | |
|---|---|---|---|
| 2,928,015 | 3/1960 | Bartels | 313/494 |
| 4,494,326 | 1/1985 | Kanamori | 40/593 |
| 4,581,683 | 4/1986 | Reiter et al. | 362/62 |
| 4,851,810 | 7/1989 | Vitale et al. | 362/240 |
| 4,864,473 | 9/1989 | Tokarz et al. | 362/84 |
| 5,566,384 | 10/1996 | Chien | 362/84 |
| 5,611,621 | 3/1997 | Chien | 362/84 |
| 5,754,064 | 5/1998 | Chien | 327/108 |
| 5,775,016 | 7/1998 | Chien | 40/544 |
| 5,921,653 | 7/1999 | Chien | 362/103 |

FOREIGN PATENT DOCUMENTS

| | | |
|---|---|---|
| 0 611 040 B1 | 1/1994 | European Pat. Off. . |
| 6 679 089 | 2/1952 | Germany . |
| 38 02 317 A1 | 10/1989 | Germany . |
| 43 38 346 A1 | 5/1995 | Germany . |
| 44 21 942 A1 | 1/1996 | Germany . |
| 195 29 884 A1 | 8/1996 | Germany . |
| 1296 16 583 U1 | 1/1997 | Germany . |
| 297 08 393 U1 | 5/1997 | Germany . |
| 297 06 600 U1 | 6/1997 | Germany . |
| 60-29349 | 2/1985 | Japan . |

*Primary Examiner*—Jeffery A. Hofsass
*Assistant Examiner*—Phung Nguyen
*Attorney, Agent, or Firm*—Evenson, McKeown, Edwards & Lenahan, P.L.L.C.

[57] ABSTRACT

A vehicle illumination system includes at least one electroluminescent light band arranged on the shell of the vehicle body. The electroluminescent light band is arranged in an indentation of the vehicle body shell such that, on its exterior, it extends essentially flush with respect to the adjoining shell area, continuously from a front head light to a rear light. It may be operated as a moving light during a certain driving maneuver, such that its moving direction corresponds to the driving direction of the vehicle.

7 Claims, 2 Drawing Sheets

VEHICLE HAVING AN ELECTROLUMINESCENT LIGHT BAND

BACKGROUND AND SUMMARY OF THE INVENTION

This application claims the priority of 197 45 993.5, filed Oct. 20, 1997, the disclosure of which is expressly incorporated by reference herein.

The invention relates to a vehicle having at least one electroluminescent light band arranged on the shell of the vehicle body.

A vehicle of this type is known from European Patent Document EP 0 611 040 B1. There the electroluminescent light band is provided in the form of a molding, which extends on the vehicle sides between the front and rear wheel areas. The strip-shaped luminous band consists of an electroluminescence-active construction which is encapsulated by a continuous, moisture-impermeable, extruded polymer.

The use of electroluminescent lights in vehicles is also known for ornaments and for the background lighting of instruments. Furthermore, it is known that electroluminescent light surfaces can be produced and used in arbitrary contours. See, for example, German Published Patent Application DE 38 02 317 A1 and U.S. Pat. No. 2,928,015.

In the vehicle disclosed in German Published Patent Application DE 195 29 884 A1, an electrically activatable luminous foil band extends around in a lower shell area below the outside lights of the vehicle, and is interrupted by the wheel housings.

A vehicle disclosed in German Published Patent Application DE 44 21 942 A1 has an illuminatable field, particularly a stroke of writing or the like, on a vehicle wall part which is provided with corresponding openings therefor. On a covered side of the wall part, a luminous foil is mounted, and a glass-like intermediate part can be provided between the wall part and the luminous foil. Elevations which project into the openings are flush with the surface of a visible side of the wall part. In particular, when the luminous foil is positioned on an entrance side member, it may be provided to automatically switch the luminous foil on and off with the opening and closing of the vehicle door by means of a door switch.

It has also been suggested to use electrically activatable luminous foils for the purpose of the brake light function on vehicles, and to position them for this purpose preferably on the rear side of the vehicle. See Registered Utility Models DE 296 16 583 U1; DE 297 06 600 U1; and DE 297 08 393 U1. Moreover, Registered Utility Model DE 1 679 089 discloses the use of a moving light for the purpose of a turn signal function on a vehicle in order to indicate a left or right turn.

The object of the present invention is to provide a vehicle of the initially mentioned type in which the electroluminescent light band is mounted in a visually and functionally advantageous manner, and/or can be triggered in a manner which advantageously indicates certain vehicle conditions.

This and other objects and advantages are achieved by the electroluminescent light band arrangement according to the invention, in which an electroluminescent light band extends from a front-side headlight to a rear light. As a result, the head light is advantageously connected with the rear light to form a total visual unit, and the shape of the light band, particularly in darkness, emphasizes the contour of the vehicle and its representative character. In addition, the light band also extends into the area of the lens of the headlight and/or the rear light which is not penetrated by radiation, further promoting the visual connection of the headlight and the rear light.

In another embodiment, the electroluminescent light band is switched on or switched off depending on the condition of an outside light of the vehicle, a central locking system or of an anti-theft system. In this manner, by correspondingly activating the light band, additional information can be provided concerning the locking of the vehicle, or the readiness state of an anti-theft warning system. Also, the activated light band can respond to the triggering of an unlocking signal of a remote central locking operation, to help find the vehicle, for example in a parking garage.

In still another embodiment, the electroluminescent light band is triggered in a special manner during a driving maneuver, for example, when driving into a parking space or out of it. Specifically it is operated as a moving light whose movement direction corresponds to the forward or backward driving direction of the vehicle. For this purpose, the light band is appropriately constructed of separate triggerable individual segments.

Finally, in a further embodiment of the invention, the electroluminescent light band is arranged specifically in an indentation of the body shell such that, on the exterior side, it extends essentially flush with the adjoining vehicle body area. This results in a smoothly extending and therefore visually appealing appearance of the vehicle body shell also in the area provided with the light band, compared to light bands which are simply additionally mounted on the vehicle body shell, for example, in the form of moldings.

Other objects, advantages and novel features of the present invention will become apparent from the following detailed description of the invention when considered in conjunction with the accompanying drawings.

DETAILED DESCRIPTION OF THE DRAWINGS

Figure 1:
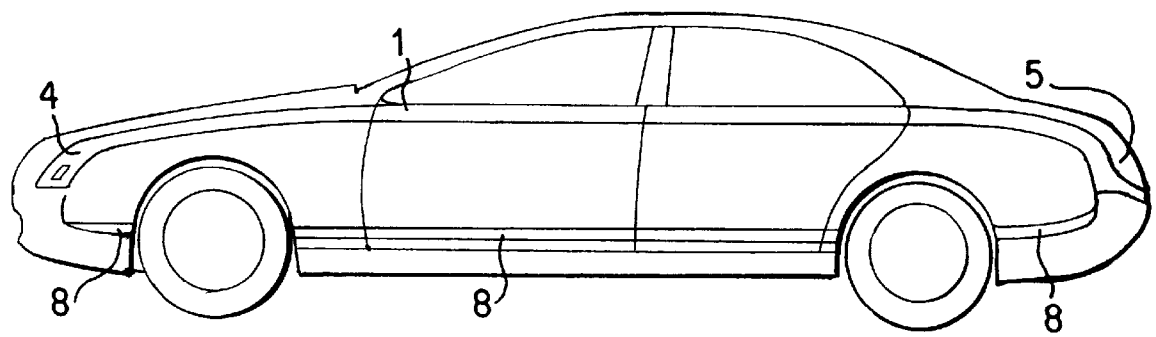
FIG. 1 is a schematic lateral view of a passenger car with electroluminescent light bands mounted on the outside of the vehicle body.
Figure 2:
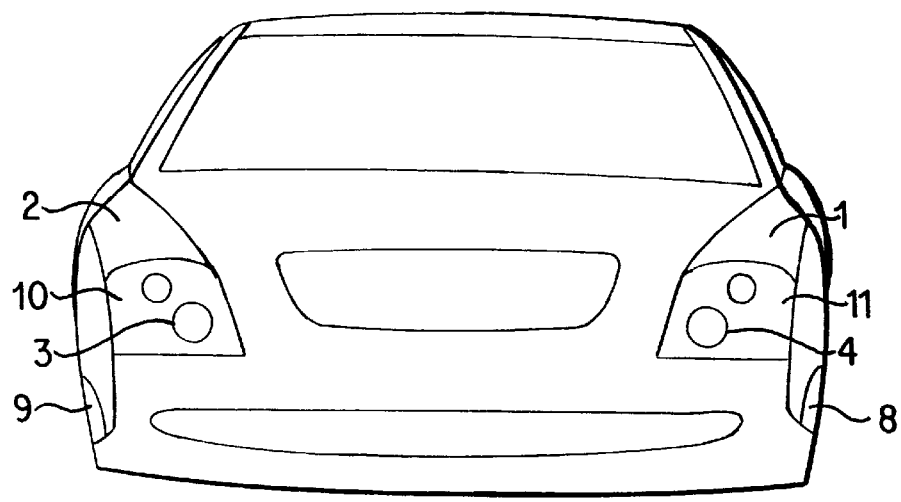
FIG. 2 is a schematic frontal view of the passenger car of FIG. 1.
Figure 3:
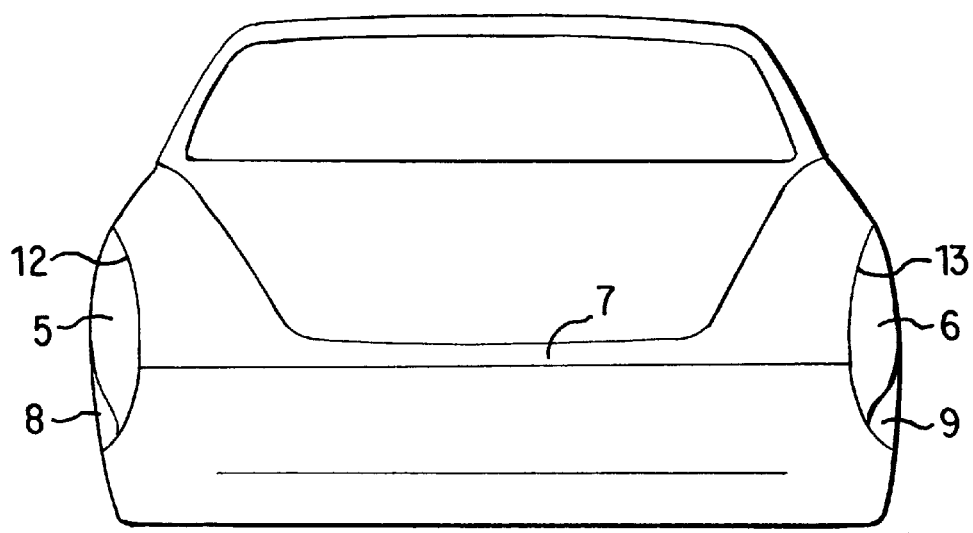
FIG. 3 is a schematic rear view of the passenger car of FIG. 1.

The passenger car illustrated in FIGS. 1 to 3 is provided along its two exterior sides of the vehicle body with one electroluminescent light band 1, 2 respectively, which each extend from a front head light 3, 4 continuously to a rear light 5, 6, essentially horizontally at the level of the upper edge of a door covering. Together with a rear light band section 7 connecting them, the two lateral light bands 1, 2 are constructed as a one-piece light band with a matching contour. Two additional lateral electroluminescent light bands 8, 9 analogously extend symmetrically at the level of the lower edge of the door covering, also from the area of the head lights 3, 4 to the area of the rear lights 5, 6, interrupted only by the wheel openings.

In the switched-on luminous condition as well as in the switched-off condition, the illustrated electroluminescent light bands 1, 2, 8, 9 form design elements which provide a balanced contrast to the painted vehicle body parts and in the process connect the head lights 3, 4 with the rear lights 5, 6, to form a total visual unit. This is also promoted by the fact that the upper light bands 1, 2 extend into the area of respective lenses 10, 11, 12, 13 of the head lights 3, 4 and of the rear lights 5, 6, and cover the areas there which are not penetrated by the radiation of the respective head lights or rear lights. Particularly in darkness, the shape and design of these electroluminescent light bands 1, 2, 7, 8, 9 emphasize the contour of the vehicle. The light bands 1, 2, 7, 8, 9, which follow the outer contours of the vehicle body, make it easier for other traffic participants to recognize the vehicle, particularly from lateral viewing angles, and also in the case of very large vehicles, and therefore improve the passive safety.

Depending on the requirement, additional electroluminescent light bands can be provided (not shown), for example, as molding-type elements or on door handles, lid and flap openers, as manufacturer's emblems, license plate areas as well as on the underside of the vehicle floor for achieving an indirect effect.

The light bands 1, 2, 7, 8, 9 are triggered by a conventional light band control, which is not shown here in detail. The switching-on and switching-off of the light bands 1, 2, 7, 8, 9 preferably takes place by the light band control automatically as a function of the condition of an outside vehicle light, a central locking system and/or of an anti-theft warning system. It may also be controlled in response to certain driving maneuvers. Thus, it may, for example, be provided that the light bands 1, 2, 7, 8, 9 are switched on and off synchronously with the normal outside vehicle lights; or they may be linked to the condition of an existing central locking system in that, when an unlocking pulse is emitted by an electronic key, the light bands 1, 2, 7, 8, 9 are switched on automatically. This arrangement can help to find the vehicle, for example, in parking garages. In addition, a corresponding information concerning the locking condition of the vehicle can be provided. By coupling the light band triggering to the condition of an anti-theft system, corresponding visual warning information can be emitted concerning a break-in/theft attempt; for example, when a vehicle door opens while the warning system is activated.

As required, the triggering of the electroluminescent light bands 1, 2, 7, 8, 9 can be designed such that it generates a moving light. In this case, the light bands 1, 2, 7, 8, 9 are constructed of smaller individually triggerable single segments. The moving-light function is useful particularly in connection with certain driving maneuvers in order to indicate a momentarily intended, or already taken, driving direction of the vehicle, such as toward the front or toward the rear. For this purpose, the moving direction of the moving light activated when driving into a parking space or out of it, or during similar driving maneuvers, is in each case selected such that it corresponds to the vehicle's momentary moving direction, or that which is intended and recognized by means of a correspondingly engaged gear. The activated moving light helps other traffic participants to estimate more easily the movement of the vehicle.

Figure 4:
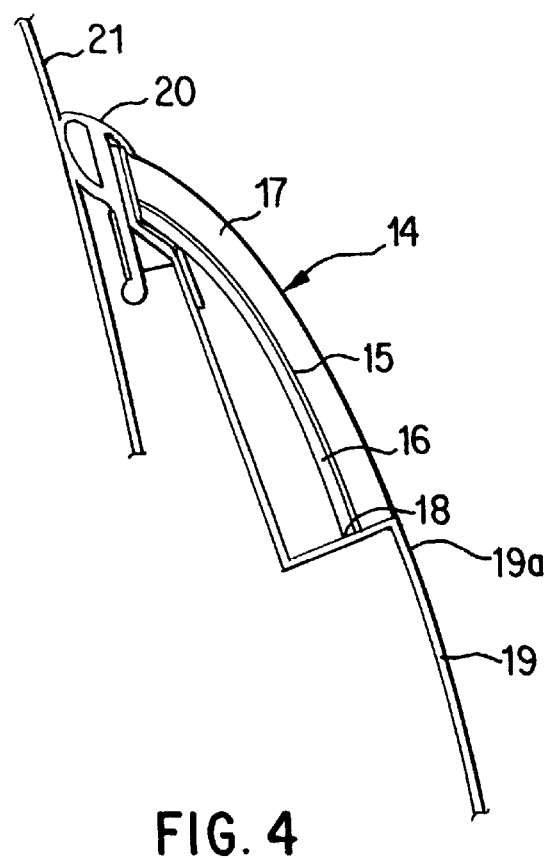
FIG. 4 is a cross-sectional view of the area of one of the electroluminescent light bands provided in the case of the passenger car of FIG. 1.

The cross-sectional view of FIG. 4 illustrates an advantageous construction and a favorable mounting of an electroluminescent light band 14 which may be part of one of the light bands 1, 2, 7, 8, 9 illustrated in FIGS. 1 to 3. As the active element, the light band 14 has an extremely flat-constructed, prefabricated conventional electroluminescent surface light, which contains a luminescent foil 15 mounted on a light-construction support part 16 made of a fiber-glass-reinforced plastic material. An alternating-voltage supply system, which is controlled by the associated light band control, is also integrated in the support part 16, as well as required fastening elements. Toward the outside, the electroluminescent foil 15 is covered by a scratch-proof transparent cover glass 17 which is structured on the interior side. The light band 14 is arranged in an indentation 18 of a vehicle body shell section 19, as, for example, a door covering, such that its exterior surface along a longitudinal side is essentially flush with the adjoining vehicle body shell area 19*a*. In this manner, the vehicle body shell retains a smoothly extending surface topology, even in the area in which the light band 14 is situated, and has no noticeable step in the transition between the light band area and the adjoining vehicle body shell area. Along its opposite longitudinal side, the electroluminescent light band 14 is accommodated in a rubber profile 20 which rests against a vehicle window area 21.

The color of the light band 14 is adapted to the vehicle paint. By using the cover glass 17 as a color filter, different tones can be provided when the light band 14 is switched on or off.

As an alternative to the light band construction illustrated in FIG. 4, instead of being mounted on a carrier layer, the electroluminescent layer can be mounted directly on the cover glass or a corresponding light-permeable cover layer. Preferably, the electroluminescent layer is designed to be capable of being dimmed by changing the applied voltage and/or to be changeable in its color by changing the alternating voltage frequency. By dividing the electroluminescent layer into arbitrarily shaped, individually triggerable zones, individual light band areas of any shape can be separately activated and deactivated in a targeted manner. As a further alternative, the electroluminescent light band can be constructed in several layers. In the latter case the individual luminous layers and the pertaining electrodes are transparent or at least partially transparent. By means of such a multi-layer light band, changes and mixtures of color can be implemented in a controllable manner.

In addition to mounting the light bands on the vehicle body shell as described above, electroluminescent light bands can also be used in the vehicle interior, for example, for the area-type lighting of the roof with various fields as a cassette roof or in the form of arbitrarily shaped elements welded to a roof lining cover; or as indirect lights which are arranged in a partially covered manner behind column or frame panels, in the leg space under a dashboard or on door panels and entrance strips; as elements for the reflected illumination of operating elements, such as switches on a center console, a dashboard or on door panels; and as elements for the background illumination of screens of operating elements for achieving a special day/night effect, in which case display functions may optionally be integrated in such a light band, for example, by separate fields and/or colors which can be triggered separately.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle having at least one electroluminescent light band arranged on a surface of the vehicle body, wherein the electroluminescent light band extends continuously from a front head light to a rear light, and additionally within an area of a lens for at least one of the head light and of the rear light, which area is not penetrated by radiation.

2. Vehicle according to claim 1, wherein the electroluminescent light band takes up its switched-on or switched-off condition as a function of a condition of at least one of an outside vehicle light, a central locking system, and an anti-theft system.

3. Vehicle according to claim 1, wherein the electroluminescent light band comprises a light which moves as a function of whether the vehicle moves forward or backward, such that a movement direction of the moving light corresponds to an actual or intended forward or backward movement of the vehicle.

4. Vehicle according to claim 3, wherein forward and backward movement are determined based on gear engagement of said vehicle.

5. Vehicle according to claim 1, wherein the electroluminescent light band is arranged in an indentation of the vehicle body shell such that, on the exterior side, it extends approximately flush with the adjoining vehicle body shell area.

6. A lighting system for a vehicle according to claim 5, comprising: a least one continuous illumination strip which extends between and visually connects illuminated portions of said front and rear lenses, thereby visually connecting said at least one head light and said at least one rear light.

7. A lighting system for a vehicle having at least one head light including an associated front lens and at least one rear light including an associated rear lens, said lighting system comprising an electroluminescent light band which extends continuously from said at least one head light to said at least one rear light, and into an area of each said front and rear lenses which is not penetrated by light from said headlight and rear light, respectively.

* * * * *